US008290682B2

(12) United States Patent
Ewert et al.

(10) Patent No.: US 8,290,682 B2
(45) Date of Patent: Oct. 16, 2012

(54) ENGINE CONTROL DEVICE AND METHOD FOR A HYBRID VEHICLE

(76) Inventors: Chris Scott Ewert, Carol Stream, IL (US); Andrew Justin Ewert, Carol Stream, IL (US)

( * ) Notice: Subject to any disclaimer, the term of this patent is extended or adjusted under 35 U.S.C. 154(b) by 503 days.

(21) Appl. No.: 12/432,522

(22) Filed: Apr. 29, 2009

(65) Prior Publication Data
US 2010/0280737 A1 Nov. 4, 2010

(51) Int. Cl.
*B60K 6/00* (2007.10)
*F02D 28/00* (2006.01)
*G06F 19/00* (2006.01)

(52) U.S. Cl. .............................. 701/99; 701/22; 180/65.3

(58) Field of Classification Search .................. 701/99, 701/22; 180/65.2, 65.4, 65.3; 318/139, 140; 123/431
See application file for complete search history.

(56) References Cited

U.S. PATENT DOCUMENTS

| | | | |
|---|---|---|---|
| 6,520,160 B2 | 2/2003 | Kojima et al. | |
| 7,213,665 B2 | 5/2007 | Yamaguchi et al. | |
| 7,220,212 B2 | 5/2007 | Endo | |
| 7,373,933 B2 | 5/2008 | Kamada et al. | |
| 7,434,641 B2 | 10/2008 | Takami et al. | |
| 7,438,664 B2 | 10/2008 | Saito | |
| 7,455,134 B2 | 11/2008 | Severinsky et al. | |
| 7,474,012 B2 | 1/2009 | Tabata et al. | |
| 7,478,691 B2 | 1/2009 | Yamaguchi et al. | |
| 7,486,034 B2 | 2/2009 | Nakamura | |
| 7,500,469 B2 | 3/2009 | Akita | |
| 7,713,163 B2* | 5/2010 | Hayashi et al. | 477/3 |
| 2006/0113129 A1* | 6/2006 | Tabata | 180/65.2 |
| 2007/0029124 A1 | 2/2007 | Dasgupta et al. | |
| 2007/0169970 A1 | 7/2007 | Kydd | |
| 2008/0202825 A1 | 8/2008 | Kerish | |
| 2008/0308328 A1 | 12/2008 | Kejha | |
| 2009/0036263 A1 | 2/2009 | Iwase et al. | |
| 2009/0076672 A1 | 3/2009 | Bajwa | |
| 2009/0118969 A1* | 5/2009 | Heap et al. | 701/102 |

* cited by examiner

*Primary Examiner* — Tan Q Nguyen
(74) *Attorney, Agent, or Firm* — Erickson Law Group, PC

(57) ABSTRACT

The invention comprises an engine control device and method for use in a vehicle incorporating an internal combustion engine and a motor that are capable of transmitting motive power to an axle. The device has an engine utilization reduction portion configured to reduce the power supplied by the engine when a requested engine power is above a predefined engine power minimum value when the device is in a hybrid mode thereby increasing power provided by the electric motor. The device also may have a computer readable engine off portion configured to prevent the engine from starting or consuming fuel thereby causing the vehicle to be directionally powered by the electric motor only. The device may also have a warm up portion configured to operate the engine in warmup mode and limit the power supplied by the engine when the engine temperature is below a predefined engine operating temperature thereby reducing emissions during engine warmup.

23 Claims, 6 Drawing Sheets

ENGINE CONTROL DEVICE AND METHOD FOR A HYBRID VEHICLE

FIELD OF THE INVENTION

The invention relates to an engine control device and method for a hybrid vehicle having two different drive units that supply driving force to a driving wheel.

BACKGROUND OF THE INVENTION

Hybrid vehicles have been proposed in an attempt to improve fuel economy at least partly in view of adverse environmental effects. Several hybrid vehicles are known that utilize a gasoline engine, an electric motor, and a battery to power a traction wheel. Several types of gasoline electric hybrid vehicles are disclosed in U.S. Pat. No. 7,455,134.

One type of gasoline electric hybrid vehicle does not receive electricity from a source external of the vehicle but utilizes a mechanism that allows the gasoline engine to recharge the battery. The battery stores energy for at least partially powering an electric motor and the vehicle controller determines and signals the proportion of power that should be generated by the electric motor and the gasoline engine based on a given set of circumstances. Some of these hybrid vehicles that do not receive external electricity can travel only short distances while being powered by only the electric motor.

The present inventors recognize that it would be desirable expand the usage of the electric motor of a hybrid vehicle. Some systems used to expand the usage of the electric motor also modify the vehicle to allow the vehicle to obtain electricity from a source other than that generated by a generator connected to the gasoline engine. In plug-in hybrid conversion systems, such electric sources may be external of the vehicle allowing the vehicle to be connected to an external electric source, such as an electric power grid.

Conversion systems, such as plug-in hybrid conversion systems for use with hybrid vehicles, like the Toyota Prius, can rely on three devices or methods of utilizing the electric motor rather than engine. According to the first method, a plug-in hybrid controller requests an electric only mode from the vehicle's main hybrid control computer (H-ECU). This method limits the vehicle's speed, for example to 34 mph on a Prius. In one type of hybrid vehicle, the H-ECU has a stock electric only mode. The H-ECU limits the speed of the vehicle to 34 mph when in electric only mode. Any conversion device using the stock mode of the H-ECU is limited to a maximum vehicle speed of 34 mph in all electric mode. The first method is limited by other operational factors, such as, battery temperature, battery charge current limit, gasoline engine temperature, and accelerator position. The first method does not provide for a mode of warming up the engine before the engine is used when switching out of electric only mode. This causes higher controlled emissions from the engine due to cold starts of the gasoline engine.

A second method alters battery charge messages being sent to the H-ECU. The battery charge messages are altered to indicate a different state of charge of the traction battery than is the actual state of charge and therefore the H-ECU responds by increasing the usage of the electric motor over the gasoline motor. This second method limits the amount of electricity utilized because in one type of hybrid vehicle if a high state of battery charge is signaled or reported to the H-ECU, the H-ECU will only use up to about 7 kilowatts of electricity to power the motor for a sustained period.

A third method forces the gasoline engine to turn off or remain off by disconnecting the engine computer (E-ECU) from the H-ECU or by powering off the E-ECU. The disconnection is achieved by physically disconnecting the E-ECU or by providing an electronic switch. This third method causes the vehicle to generate diagnostic trouble codes. These trouble codes may require the operator cycle the vehicle off and back on to restart the gasoline engine. Restarting the vehicle is often not practical, and under some circumstances, not safe. This method may also require frequent clearing of the diagnostic trouble codes from the vehicle computer system, which may prohibit the vehicle from meeting many clean air regulations. Moreover, under the third method, the vehicle is limited to 42 mph when the motor is operating within its rated safety speed.

A Hybrid Vehicle

The control device of the invention operates in a hybrid vehicle 50, such as for example that disclosed in U.S. Pat. No. 6,520,160 issued Feb. 18, 2003, which is incorporated by reference except to the extent modified herein. FIG. 1 based on FIG. 1 of U.S. Pat. No. 6,520,160 shows a schematical view of one type of hybrid vehicle 50. The vehicle has two drive sources. The drive sources are an internal combustion engine 1 and an electric motor 2. The engine has a water temperature sensor 18 that provides an electric signal corresponding to the temperature of the cooling water of the engine 1.

The engine discharges exhaust air from the combustion cylinders through an exhaust discharge pipe 13. An emission gas purifying catalyzer 14 for purifying harmful gas component in emission gas is provided in the discharge pipe 13. The emission gas purifying catalyzer or catalytic converter 14 may be provided with a catalyzer temperature sensor 15 for outputting an electric signal corresponding to the temperature of the emission gas purifying catalyzer 14.

A crank shaft, which is an output shaft of the internal combustion engine 1, is coupled with an output shaft 1a and the output shaft 1a is coupled with a drive power dividing mechanism 4. The drive power dividing mechanism 4 is mechanically connected to a power generator 3 and a rotation shaft (motor rotation shaft) 2a of an electric motor 2.

The drive power dividing mechanism 4 is comprised of, for example, planetary carrier supporting a pinion gear freely rotatably, ring gear disposed outside the planetary carrier, and planetary gear having a sun gear disposed inside the planetary carrier. A rotation shaft of the planetary carrier is coupled with the output shaft 1a, the rotation shaft of the ring gear is coupled with the rotation shaft 2a of the motor, and the rotation shaft of the sun gear is coupled with the power generator 3. The power dividing mechanism 4 is further explained in U.S. Pat. No. 7,486,034 where it is described as a power split device, which is incorporated by reference.

The power generator 3 is incorporated in the hybrid vehicle for operating as an electric generator driven by the engine and operating as an electric motor capable of starting the engine, while motor 2 is incorporated in the hybrid vehicle for serving as an electric motor that drives a driving wheel of the hybrid vehicle.

A reduction gear 7 is coupled with the rotation shaft 2a of the electric motor 2 and wheels, which are driving wheels, are coupled with the reduction gear 7 through drive shafts 8, 9. The reduction gear 7 is constituted by combining plural gears and reduces a rotation speed of the rotation shaft 2a and transmits it to the drive shafts 8, 9.

The power generator 3 is connected electrically to an inverter 5 and the inverter 5 is electrically connected to a battery 6 and the electric motor 2. The battery 6 is provided with a battery controller 16 for calculating a state of charge of the battery 6.

The electric motor 2 may comprise an AC synchronous motor and, if an electric power generated by the power generator 3 and/or electric power from the battery 6 is applied, the rotation shaft 2a of the motor is rotated at a torque corresponding to the magnitude of applied electric power.

The vehicle 50 has an electronic control unit (E-ECU) 23 for controlling the internal combustion engine 1 and a vehicle electronic control unit (H-ECU) 24 for controlling the entire hybrid mechanism synthetically. These E-ECU 23 and H-ECU 24 are connected to each other through an interactive communication line or communication bus 52.

A catalyzer temperature sensor 15, a crank position sensor 17, a water temperature sensor 18, a throttle position sensor 19a, air-fuel ratio sensor 27, an air flow meter 31 and the like are connected to the E-ECU 23 through electric wiring so that output signals from the respective sensors are inputted to the E-ECU 23.

A throttle actuator 19b, an ignition plug 25 and a fuel injection valve 26 are connected to the E-ECU 23 through electric wiring so that a control signal can be transmitted from the E-ECU 23 to the throttle actuator 19b, the ignition plug 25 and the fuel injection valve 26.

The battery controller 16, an accelerator position sensor 29 for outputting an electric signal corresponding to an operating amount (accelerator opening degree) of the accelerator pedal 28 mounted in the vehicle compartment, a vehicle speed sensor 30 for outputting an electric signal corresponding to a traveling speed of the vehicle and the like are connected to the H-ECU 24 through electric wiring and output signal of each sensor is inputted to the H-ECU 24.

The H-ECU 24 is connected to the electric motor 2, the power generator 3, and the inverter 5 through electric wiring so that a control signal can be transmitted from the H-ECU 24 to the electric motor 2, the power generator 3 and the inverter 5.

In the control system having such a structure, the H-ECU 24 controls the electric motor 2, the power generator 3, and the inverter 5 according to output signals from the accelerator position sensor 29, the battery controller 16 and the like and sends messages or signals through the communication line 52 to control the internal combustion engine 1 through the E-ECU 23. While the foregoing demonstrates one type of hybrid vehicle, the inventors recognize it would be desirable to have a device that is not limited to use with one type or model of hybrid vehicle.

Engine Warmup and Emissions

Generally, vehicle emissions are evaluated by placing the test car on a dynamometer (dyno) where the dynamometer simulates the vehicle being driven by driving a predetermined route, called a dyno drive cycle or drive schedule. A common drive cycle is the urban dyno drive schedule (UDDS). Normally the ignition of the car is pressed and the test will start about 12-15 seconds after the ignition has been pressed before entering a gentle hill. This gives the car time to go through a controlled warm up of the engine and exhaust catalyst while stopped and at low engine power on the first hill. While this test accurately measures emissions produced, it does not necessarily represent real-world conditions where a driver starts the car and accelerates moderately or quickly before the car has a chance to warm up the catalyst. This real-world example leads to worse emissions over that emitted in the urban dyno drive.

A problem arising when modifying certain hybrid vehicles, such as to allow it to receive power from a source external of the vehicle and to operate only powered only by the electric motor, is that it is possible to start the car in an electric mode only, where the gas engine is not started and not warmed up, and thus the catalyst or catalytic converter is never heated. When either the battery depletes or the driver demands more power than the electric mode can supply, the gas engine is started suddenly. When this occurs, the gas engine is run at high power before the catalyst is warmed up leading to increased emissions.

The present inventors recognize that it would be advantageous to provide a device and method configured to allow the gasoline engine to go through a proper warm up cycle while the vehicle is powered by the electric motor only.

The present inventors recognize that it would be advantageous to provide a device and method configured to shut down the gasoline engine and or prevent the gasoline engine from starting and allow the vehicle to be powered by the electric motor. The inventors recognize that it would be advantageous to provide a device and method configured to allow the vehicle's main hybrid controller to supplement a lack of gasoline engine power with increased electric power and without causing diagnostic trouble codes to be generated.

The present inventors recognize that it would be advantageous to provide a device and method configured to allow a hybrid vehicle to use more than 7 kilowatts of electricity for a sustained period. The present inventors recognize that it would be advantageous to provide a device and method configured to allow a hybrid vehicle to use at least about 25 kilowatts or more of electricity for a sustained period.

The present inventors recognize that it would be advantageous to provide a device and method configured to allow the gas engine to be run at different speeds or revolutions per minute (RPM) and different power output than requested by the main hybrid controller in order to change balance of power generated between the gasoline engine and the electric motor.

SUMMARY OF THE INVENTION

The invention comprises an engine control device and method for use in a vehicle incorporating an internal combustion engine and a motor that are capable of transmitting motive power to an axle. The device has an input configured to intercept a computer readable engine control message or an engine request message and an output configured to transmit a computer readable message. The device has a computer readable engine utilization reduction portion configured to reduce the power supplied by the engine when a requested engine power is above a predefined engine power minimum value when the device is in a hybrid mode.

In one embodiment, the device has a computer readable engine off portion configured to prevent the engine from starting or consuming fuel.

In one embodiment, the input portion is connected to a vehicle main controller and the output portion is connected to a second engine controller. The engine control device intercepts at least one type of engine control message or engine request message traveling between the vehicle main controller and second engine controller.

In one embodiment, the input portion is configured to intercept an engine control message having an engine power request value. The engine off portion comprises an engine power request modification portion configured to prevent the engine from starting or consuming fuel when the engine power request represents an engine power request greater than zero.

In one embodiment, the engine power request modification portion is configured to change the engine power request value to a new engine power request value corresponding to an engine power request of zero when the engine power request value corresponds to an engine power request greater than zero.

In one embodiment, the input portion is configured to intercept an engine control message having an engine speed request value. The engine off portion comprises engine speed modification portion configured to change the speed value to a new engine speed request value corresponding to an engine speed request of zero when the engine power request value corresponds to an engine speed request greater than zero.

In one embodiment, the input portion is configured to intercept an engine control message having an engine control flag and a fuel cut flag. The engine off portion has an engine control flag modification portion configured to change the engine control flag to signal an engine off condition. The engine off portion has a fuel cut flag modification portion configured stop the follow of fuel to the engine.

In one embodiment, the input portion is configured to intercept an engine control message having an engine torque request. The engine utilization reduction portion comprises an engine power request modification portion configured prevent the engine from starting or consuming fuel when the engine torque request value represents an engine power request less than an available motor torque.

In one embodiment, the input portion is configured to intercept an engine control message having an engine torque request. The engine utilization reduction portion comprises an engine torque request modification portion to reduce the power supplied by the engine to a reduced torque output. The engine utilization reduction portion is configured to calculate the reduced torque output by subtracting the engine torque request from an available motor torque.

In one embodiment, the engine utilization reduction portion is configured to limit the power supplied by the engine when the engine temperature is below a predefined engine operating temperature.

In one embodiment, the device has a warmup mode and a warm up portion. The warm up portion is configured to operate the engine in warmup mode and limit the power supplied by the engine when the engine temperature is below a predefined engine operating temperature.

In one embodiment, the device has a warmup mode and a warm up portion. The warm up portion is configured to operate the engine in warmup mode and limit the power supplied by the engine when a second engine controller signal connected to the engine control device requests to operate the engine in warmup mode and when a main vehicle controller signal connected to the engine control device indicates the vehicle is in a drive mode.

Numerous other advantages and features of the present invention will be become readily apparent from the following detailed description of the invention and the embodiments thereof, from the claims and from the accompanying drawings.

DETAILED DESCRIPTION

Figure 1:
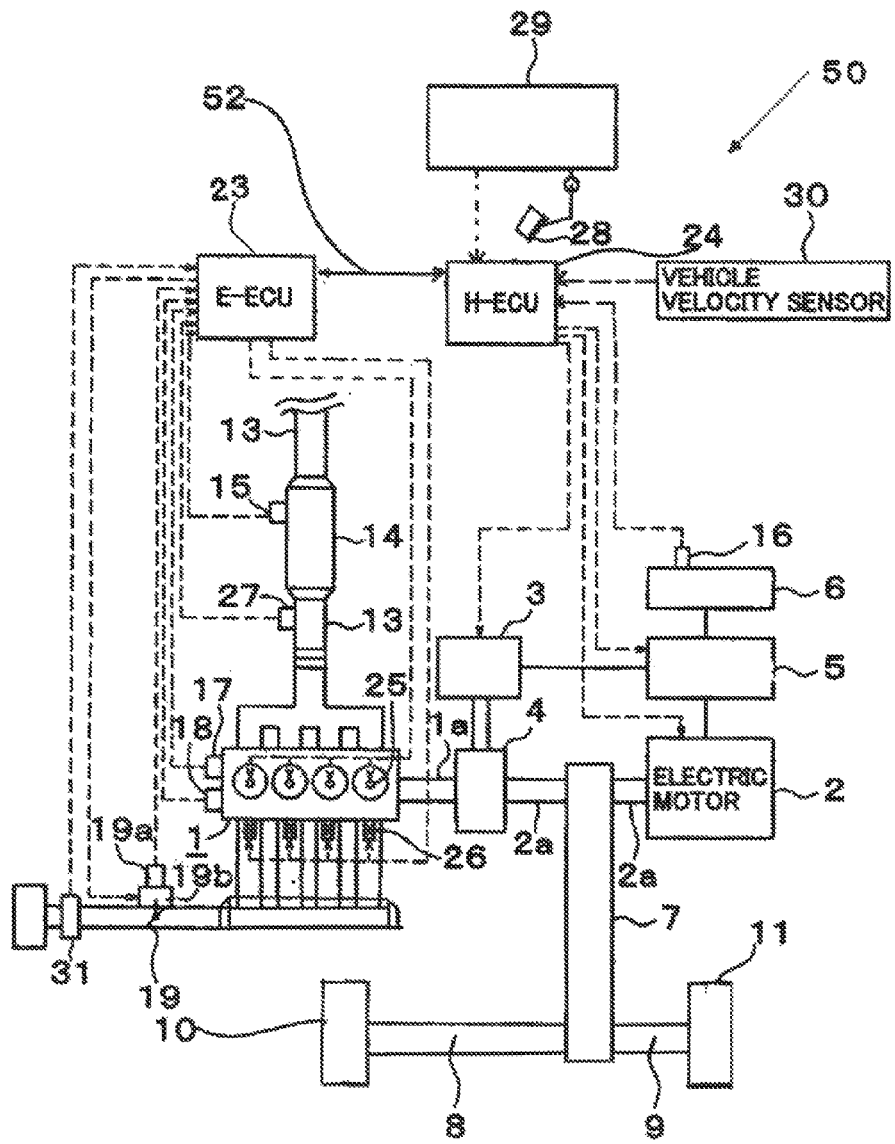
FIG. 1 is a prior art schematic diagram hybrid vehicle having a hybrid mechanism.
Figure 2:
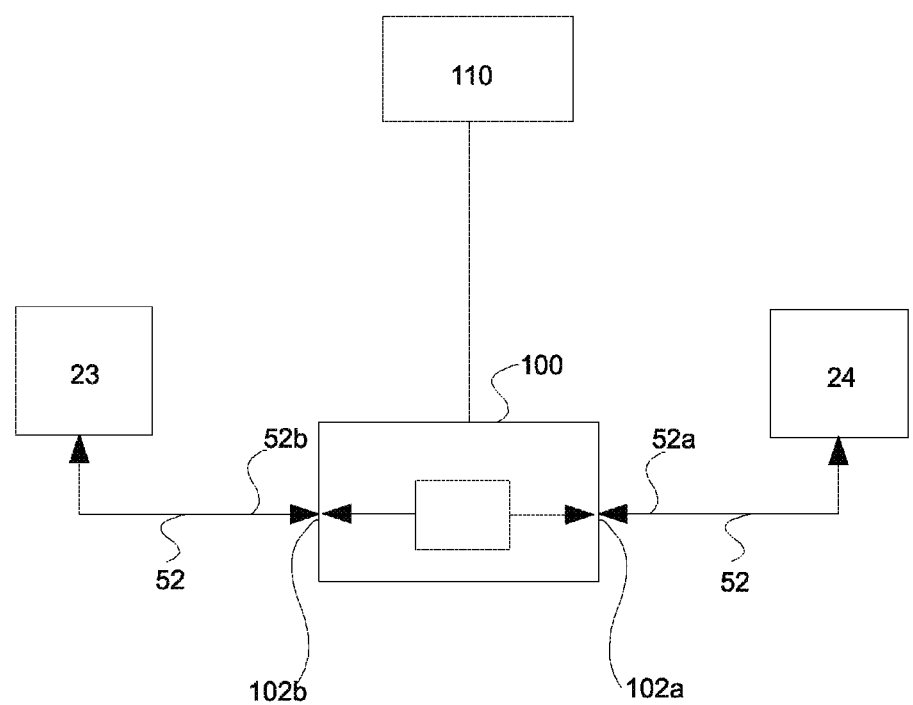
FIG. 2 is a schematic diagram of an engine control device of the invention connected to a portion of a hybrid mechanism of a hybrid vehicle.

While this invention is susceptible of embodiments in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

The Control Device

The engine control device 100 is placed between the H-ECU 24 and the E-ECU 23 on the communication bus 52 or is otherwise arranged to intercept messages traveling between the a main vehicle controller, such as the H-ECU 24 and an engine or a second engine controller such as the E-ECU 23. The device 100 splits the bus 52 to two segments. A H-ECU side 52a of the bus connects to a H-ECU port 102a and an E-ECU side 52b of the bus connects to an E-ECU port 102b of the device 100.

Figure 3:
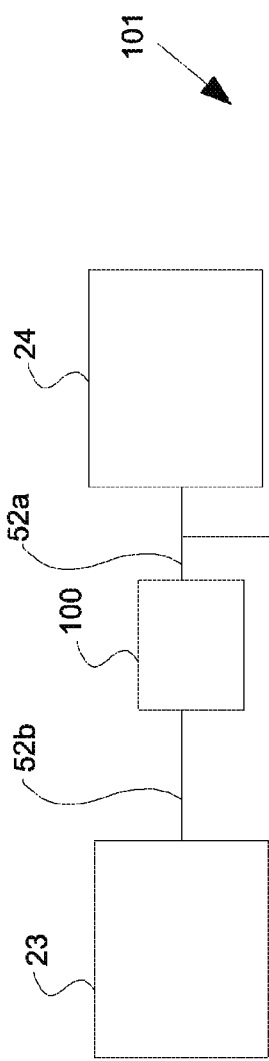
FIG. 3 is a schematic diagram of an engine control device, a second battery controller, an enhanced battery, connected to a portion of a hybrid mechanism of a hybrid vehicle.
Figure 3:
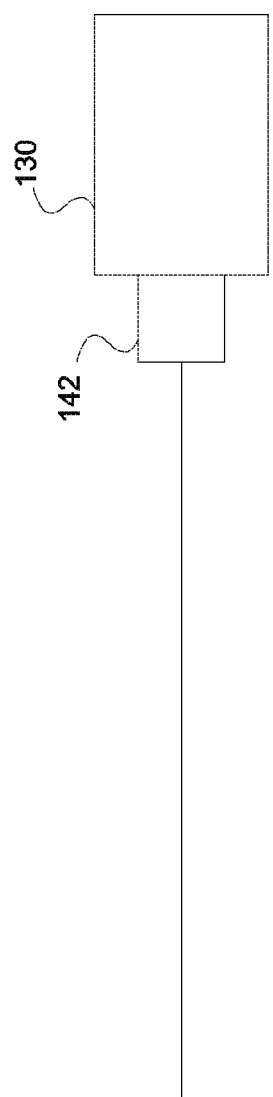
Figure 3A:
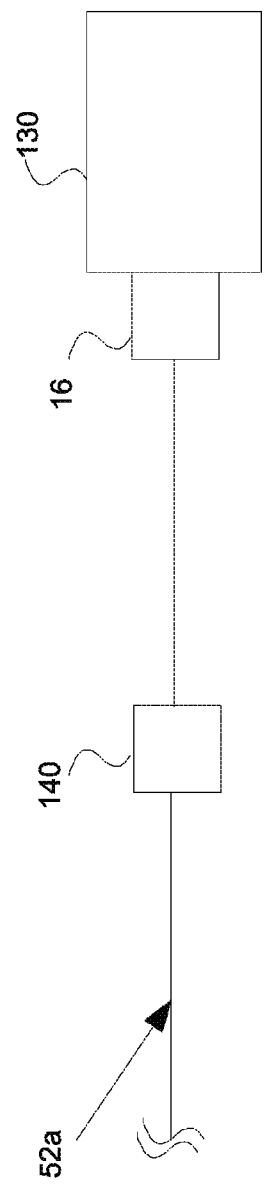

In one embodiment, as shown in FIG. 3, the system 101 comprises an enhanced battery 130 and enhanced battery controller 142. The enhanced battery controller 142 is signal connected to the H-ECU side 52a of the bus. Alternatively, as shown in FIG. 3A, the first battery controller 16 may be signal connected to an enhanced battery 130. A second battery 140 controller is placed between the first battery controller 16 and the H-ECU 24 on the H-ECU side 52a of the bus. The enhanced battery controller and the second battery controller interpret and modify signals to and from the enhanced battery so that H-ECU 24 functions properly with an enhanced battery. This is necessary because, at least in part, the enhanced battery may operate at charge levels that are outside of the operational charge range of the original battery.

The device 100 is signal connected to a user control interface 110 where a user may select operating modes of the device 100. The device 100 may have three operating modes. The first mode is an electric only mode where the device intercepts and/or modifies certain signals or messages from the H-ECU intended for the E-ECU to prevent the engine 1 from consuming fuel such that vehicle will be directionally powered only the electric motor 2. The second mode is enhanced hybrid mode where the device intercepts and/or modifies certain signals or messages traveling between the H-ECU 24 and the E-ECU 23 to allow the engine to consume fuel but reducing the engine power output below that requested by the H-ECU 24. A reduction in power provided by the engine will cause the H-ECU to provide more power from the electric motor to move the vehicle. The third mode is a pass-through mode where the device 100 does not modify messages passing between the E-ECU 23 and the H-ECU 24, but rather passes the messages through the device without modification.

Electric Only Mode

When the device 100 is in electric only mode, it intercepts messages intended for the E-ECU 23 and received on H-ECU 24 port 102a. Generally the device 100 modifies engine control messages that contain a command that will cause the engine to consume fuel. As a result the device prevents the engine from consuming fuel.

In one type of hybrid vehicle, the vehicle speed is limited when the engine is not turning and the motor 2 is powering the vehicle while operating within its rated safety speed. This limitation is caused by the fact that in order to keep the gasoline engine 1 from spinning while the car is being driven by the motor 2, it is necessary for power generator 3 to freewheel or spin in the opposite direction. When the gas engine 1 doesn't spin at all, the power generator 3 reaches a maximum safe speed at 42 mph and an absolute maximum speed at 52 mph.

To obtain speeds in excess of this limit, H-ECU must command the power generator 3 to turn the engine 1 through the power dividing mechanism 4 without the engine consuming fuel so that the power dividing mechanism 4 will distribute power such that the electric motor 2 will movably power the vehicle in electric only mode in speeds greater than those possible when the electric motor 2 is turning at its maximum rated speed and the engine 1 is not rotating. In one type of hybrid vehicle, this allows speeds in excess of 42 mph when powered only by electric power.

The device 100 intercepts and reads signals or messages received on the H-ECU input 102a. When a message having a start engine instruction is received on the H-ECU input 102a, the message is read into an internal memory buffer of the device. The device 100 then modifies the messages to remove or change the one or more start engine instructions. Engine start instructions include any instruction in an engine control message that will cause the engine to consume fuel. The device will then calculate the proper checksum value for the modified message and insert that proper checksum into the message. The modified message is then sent out to the E-ECU side 52b of the bus via the E-ECU port 102b preventing the engine from consuming fuel.

Figure 4:
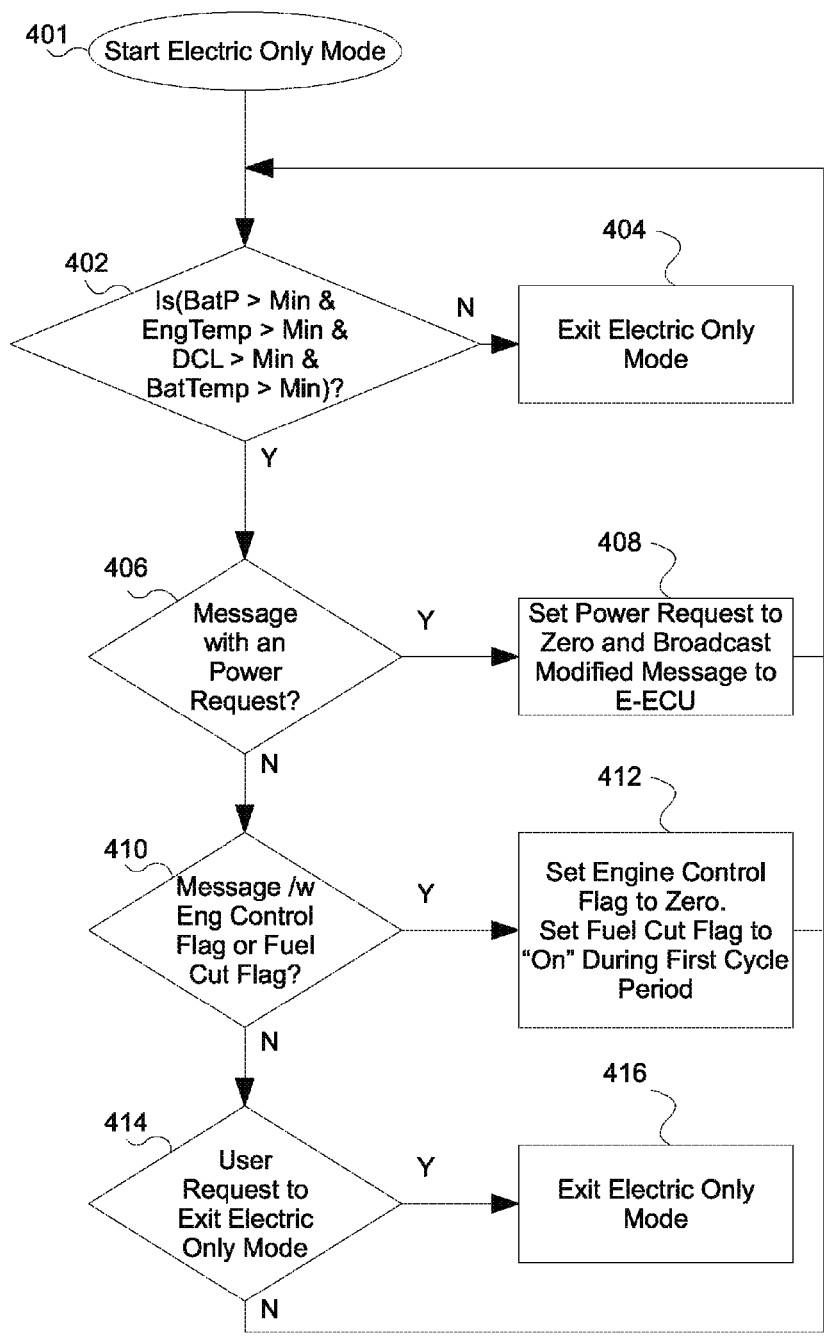
FIG. 4 is a flow diagram of an operation of the engine control device in an electric only mode.

In an embodiment shown in FIG. 4, the device 100 enters electric only mode in step 401. The device receives one or more messages having one or more of the following: a battery power level, a discharge current limit, a battery temperature, an engine block temperature. The messages will be received from the H-ECU side 52 of the bus 52. In step 402, the device determines whether a number of preconditions exist for operation in electric only mode. The device determines whether the current level of battery power is greater than a predefined minimum battery power. The device determines whether the discharge current limit (DCL) is greater than a predefined discharge current limit minimum. The device determines whether the battery temperature is greater than a predefined battery temperature minimum. The device determines whether the engine block temperature is greater than a predefined engine block temperature minimum. In order to achieve certain vehicle speeds from the motor 2 through power dividing mechanism 4, the power generator 3 must rotate the engine 1 when the engine is not burning fuel. Therefore, an engine block temperature minimum is necessary to prevent damage to the engine when it is turned by the power generator 3 without the engine 1 burning fuel. The device receives battery power level information from the battery controller 16 or second battery controller 140. The device could also receive battery power level information from the H-ECU 24. In step 404, the device 100 will exit electric only mode if (1) the current level of battery power is less than a predefined minimum battery power, (2) the discharge current limit (DCL) is less than a predefined discharge current limit minimum, (3) the battery temperature is less than a predefined battery temperature minimum, or (4) the engine block temperature is less than a predefined engine block temperature minimum.

When the device 100 is in electric only mode, the device will modify any message containing a request for engine torque or power where that value represents a request for engine power that is greater than zero power. According to at least one type of one hybrid vehicle, the E-ECU 23 will start the engine when it receives a message requesting engine power where that power request is greater than zero regardless of other engine off indicating commands in engine control messages. Also, in order to prevent the H-ECU or the E-ECU from generating self-diagnostic warning codes, when the device 100 causes the vehicle to operate in electric only mode, engine control messages containing engine RPM requests, engine fuel cut flags, and engine control flags must be modified.

In step 406, when the device receives a message containing a request for engine power that is greater than zero, in step 408 the device will modify that message to provide a value corresponding to an engine power setting of zero, so that the message will request no power from the engine. The device will broadcast the modified message to the E-ECU 24 from the E-ECU port 102b to prevent the engine from starting and consuming fuel.

In step 410, the device will modify any message containing an engine control flag or a fuel cut flag. In step 412, the device will modify an engine control flag to signal an engine off condition and a fuel cut flag to stop the fuel flow. The device only sets the fuel cut flag during a predefined preliminary operation time, such as the first 5 seconds, when the device is in electric only mode. The engine control flag and the fuel cut flag maybe in the same message. However, in another alternative embodiment the engine control flag, and the fuel cut flag may be in separate messages and the device 100 will intercept and modify those messages separately. The device transmits the modified message or messages to the E-ECU 23 from the E-ECU port 102b to prevent the engine from starting and consuming fuel.

In one embodiment, the device is programmed to recognize a message having a predefined message ID or having one of a predefined number of message IDs. According to at least one type of one hybrid vehicle, the device will intercept message having a message ID of 0x038 and a message ID of 0x348.

The device will intercept messages having a message ID of 0x038 and read the message into a buffer of the engine control device 100. The 0x038 message contains instructions regarding engine power or torque in at least byte #1 of the message. The device will modify byte #1 to be 0x00 corresponding to an engine power setting of zero, so that the message will not request power from the engine. The device 100 will transmit the modified message to the E-ECU 23 from the E-ECU port 102b to prevent the engine from starting and consuming fuel. Setting an engine power request to zero only keeps the engine from consuming fuel when torque is requested by the H-ECU. This does not keep the engine from consuming fuel when the engine is idling, such as, under certain circumstances, when the vehicle is stopped. To prevent the engine from consuming fuel in all instances, the engine power request must be set to zero and a message having an engine RPM, for example a message with Message ID of 0x348, request must be modified as explained next.

The device will intercept messages having a message ID of 0x348. When a message with ID of 0x348 is received, or at a set interval, byte #1 (0 based counting) is read in the buffer (not shown) of the device. When in a first cycle period of the electric only mode, the device will change an engine control flag at byte #0 to 0x00. The device will change a fuel cut flag at byte #1 to 0x01. The device will change an engine RPM request byte at byte #2 to 00. The device will set bytes #3 and #4 to zero. The device will calculate a new checksum value based on the modified message and replace the original checksum value with the new checksum value using a checksum calculating algorithm explained below. The device will then transmit the modified message from the E-ECU port 102*b* of the device 100 to the E-ECU 23. The device will operate in the first cycle period once per each time that the vehicle is started or in an on condition. The first cycle period occurs for a predefined time period, for example five seconds.

After the first cycle period, the device will enter an emission lowering cycle period and transmit an emissions lowering message. When sending an emissions lowering message, the device will change an engine control flag at byte #0 to 0x04 to open an air intake for the engine 1. The device will change the engine spin without fuel flag at byte #1 to 0x60 to signal that the engine will spin without fuel and spun by the power generator 3. The device will set the RPM speed value to a minimum spin speed at byte #2 to 0x27 to signal the rate to spin the engine. The device will pass bytes #3 and #4 without modification. The device will calculate a new checksum value corresponding to the modified message.

The device will intercept messages having a message ID of 0x038 and read the message into the buffer. The 0x038 message contains instructions regarding engine power or torque in at least byte #1 of the message. The device will modify byte #1 to be 0x00. The device will calculate a new checksum value based on the modified message and replace the original checksum value with the new checksum value. The device will then transmit the modified message from the E-ECU port of the device 100 to the E-ECU 23.

While particular specified values have been provided corresponding to one particular type of value representing an engine power request, engine RPM request, the engine control flag, and the fuel cut flag within a particular engine control message, one skilled in the art will understand that the device is not limited to the values shown but operates to prevent the engine from starting by modifying engine control massages that signal the engine to start, run, or consume fuel.

In an embodiment, the device may not wait for a particular message to be received on the H-ECU port 52*a*, but instead will send a message out to the E-ECU 23 on the E-ECU 23 port at a predefined interval, where the message will to provide a value corresponding to an engine power setting of zero, so that the message will request no power from the engine.

Enhanced Hybrid Mode

When the device 100 is in enhanced hybrid mode, the device intercepts and/or modifies certain signals or messages from the H-ECU 24 intended for the E-ECU 23 to allow the engine to consume fuel but reducing the engine power output below that requested by the H-ECU 24 whereby the H-ECU will cause the electric motor to provide increased power to move the vehicle compensating for the reduced engine power. When in an enhanced hybrid mode the engine may consume fuel.

Figure 5:
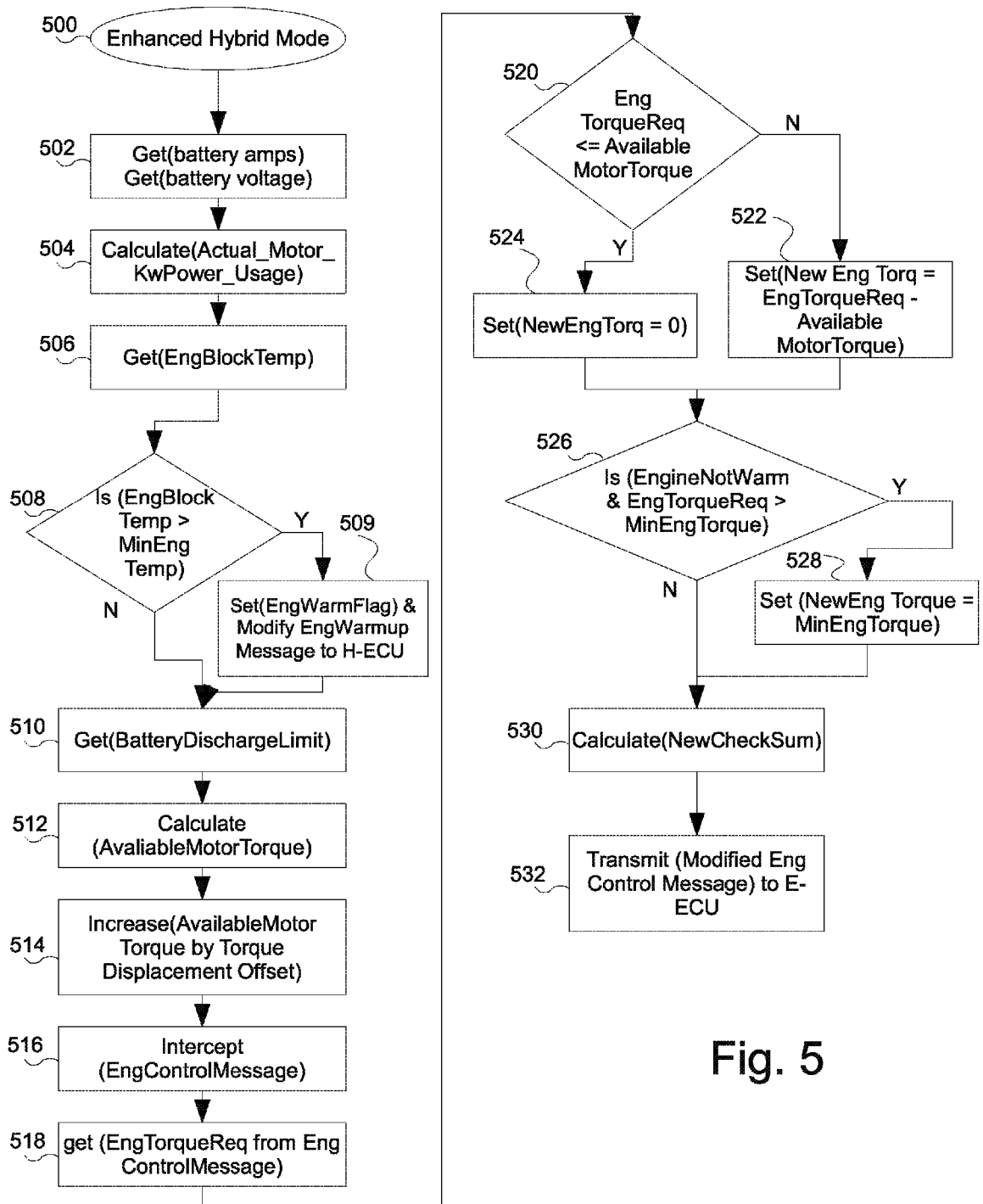
FIG. 5 is a flow diagram of an operation of the engine control device in an enhanced hybrid mode.

Referring to FIG. 5, the device 100 will intercept or receive messages having, an amperage value, a battery voltage value, an engine block temperature value, a battery discharge limit, an engine torque request, or an engine warmup request. When in enhanced hybrid mode, in step 502, the device receives a battery status message having amperage value representing the electric current flow from the battery and a battery voltage value representing the battery voltage. The battery status message may be received from the H-ECU 24 or the battery controller 16 or the second battery controller 140. In step 504, the device calculates the actual motor kilowatt (power) usage by multiplying the battery voltage by the amperage. In step 506, the device intercepts a message having an engine block temperature value or an engine coolant temperature value representing a temperature of the engine block or an engine coolant temperature, respectively. In step 509, the device sets an engine warm flag in a memory of the device if the engine block temperature is above a predefined minimum engine operating temperature as determined in step 508. The minimum engine operating temperature is the temperature above which the engine is considered warmed up and within an engine operating temperature range. If the warmup flag is set, the device will intercept and modify messages having an engine warmup flag and will turn off the engine warmup request indicators. In one type of hybrid vehicle, a message having an catalytic warmup request indicator has a message ID of 3C8 and the catalytic warmup request indicator is represented at bit #2 of byte #0. The device transmits the 3C8 type messages to the H-ECU. In step 510, the device receives or intercepts a battery status message having a battery discharge limit, which is published by the battery controller 16 or 140. The battery discharge limit represents the maximum amperage that can safely be drawn from the battery.

In step 512, the device calculates the available motor torque. First the device determines a maximum motor torque by multiplying the maximum discharge limit by the maximum battery voltage available at the maximum discharge limit. The device determines the available motor torque by subtracting the maximum motor torque from the actual motor kilowatt usage. The max voltage at limit is a predefined value representing the voltage that the battery is reduced to when the system is pulling battery discharge limit amperages. In one embodiment, max voltage at limit is 190.

In one type of hybrid, when the device 100 reduces the requested engine torque provided in an engine control message to the E-ECU 23, the H-ECU 24 will notice the reduction, also known as power displaced, and compensate by increasing the power delivered to the motor. However the H-ECU may not compensate at a one-to-one ratio with respect to providing one unit of increased power to the motor for every one unit of decreased power to the engine. The H-ECU 24 provides additional power to the motor 2 at less than a one-to-one ratio for every unit of engine power reduced or displaced. Therefore, in such a situation, a torque displacement offset may be introduced. In step 514, the device determines the adjusted actively used torque by adding a predefined torque offset to the actively used torque. The device then determines the available motor torque by subtracting the adjusted actively used torque from the maximum motor torque.

In step 516, the device intercepts an engine control message having an engine torque request. In step 518, the device reads the engine torque request from the engine control message. In step 520, if the engine torque request is less than or equal to the available motor torque, then in step 524 the device sets the new engine torque request value to zero so that the engine is not utilized. If the engine torque request is greater than the available motor torque, in step 522, the device subtracts the engine torque request from the available motor torque to obtain the new engine torque request value.

In step 526, if the engine warm flag of step 509 is not set and the engine torque request is greater than the maximum engine warmup torque, then in step 528, the device sets the new engine torque to the maximum engine warmup torque to allow the engine to warmup. This allows the engine to remain at a temperature range for efficient engine operation. This warmup is to ensure a minimum engine block temperature, which is different from the warmup mode of FIG. 6 that warms up the catalytic converter 14.

In step 530, the device inputs the new engine torque request into the engine control message of step 516 to create a modified engine control message. The device calculates a new checksum value for the modified engine control message and inputs the new checksum value into the modified engine control message. The checksum is calculated by summing the message ID, the message length, and the values in byte 0, byte 1, byte 2, byte 3, byte 4, and byte 5. To complete the checksum calculation, the device performs the modulo operation to find the remainder of division of the sum value by 256. The integrity of the data can be checked at any later time by re-computing the checksum and comparing it with the one stored in the message. In step 532, the device transmits the modified engine control message to the E-ECU 23.

While not shown in FIG. 5 the device 100 will also intercept messages coming from the E-ECU 23 going to the H-ECU 24 having an engine warmup request when the device is in enhanced hybrid mode. In one type of hybrid vehicle, the E-ECU 23 will send a message to the H-ECU 24 requesting that the H-ECU 24 give the E-ECU 23 permission to enter engine warmup mode. When the device 100 is not utilized or is in pass-through mode, the H-ECU 24 will send an engine control message to the E-ECU 23 with an engine warmup permission instruction, under certain circumstances, that grants permission and signals the E-ECU 23 to operate the engine in warmup mode. When the device is in enhanced hybrid mode, the device intercepts a message from the E-ECU having an engine warmup request. The device modifies a message having an engine warmup request if the engine block temperature or engine coolant temperature is above a predefined minimum. The device modifies the message to remove the engine warmup request, calculates and inserts a new checksum value for the modified message. The device then sends the modified message to the H-ECU 24.

In one embodiment, the device 100 modifies particular bytes and/or bits of particular of messages having a particular message identification numbers to carry out the above described function of the device in enhanced hybrid mode. One skilled in the art will recognize that the invention is not limited to the following description of particularly modified bytes and/or bits of particular of messages having a particular message identification numbers. The message having a battery amperage value and a battery voltage value has a message ID of 0x03B. In the 0x03B. The unit value representing amps is in a 12 bit signed message where 0.1 corresponds to 1 amp and the value is negative when the battery is charging. The unit value for volts is 1 unit per volt. The unit value for a value representing the state of charge of the battery is 0.5% per unit. The message with a message ID of 0x03B, has a battery amperage value represented in bytes #0 and #1 and a battery voltage value represented in bytes #2 and #3. The message having an engine block temperature has a message ID of 0x039 which the engine block temperature is represented in byte #0 of the message and each integer value represents one degree Celsius. The battery status message having a battery discharge limit has a message ID of 0x3CB where the discharge limit is represented in byte #0 and each integer value represents one amp. The message having an engine torque request, has a message ID of 0x038 where the engine torque request is represented in byte #1. Each integer value of byte #1 represents 0.25 kilowatts of power or torque. The message having an engine warmup request, has a message ID of 0x3C8 where the warmup request is represented in bit #2. Setting bit #2 to 0 provides no warmup request. In one embodiment, the maximum engine warmup torque is 1.25 kilowatts.

Engine Warmup Mode

When the engine has not been started or has been stopped long enough for the engine temperature or the engine coolant temperature to drop below a predefined temperature, the engine should be started in a catalytic warmup mode to reduce the engine's production of emissions before the engine is at operating temperature. This warmup mode is to warm up the catalytic converter 14, the engine will warm up over time of operation.

The warmup mode of the device 100 is intended to operate the engine in warmup mode to prevent the engine from running at high power before it is warmed up or to reduce the emission that would be produced during a high power situation before the engine is at an operating temperature. In warmup mode, the device will intercept or receive messages capable of containing, a gear shift position value, an engine warm up request, an engine warmup permission value, or an engine torque instruction.

Figure 6:
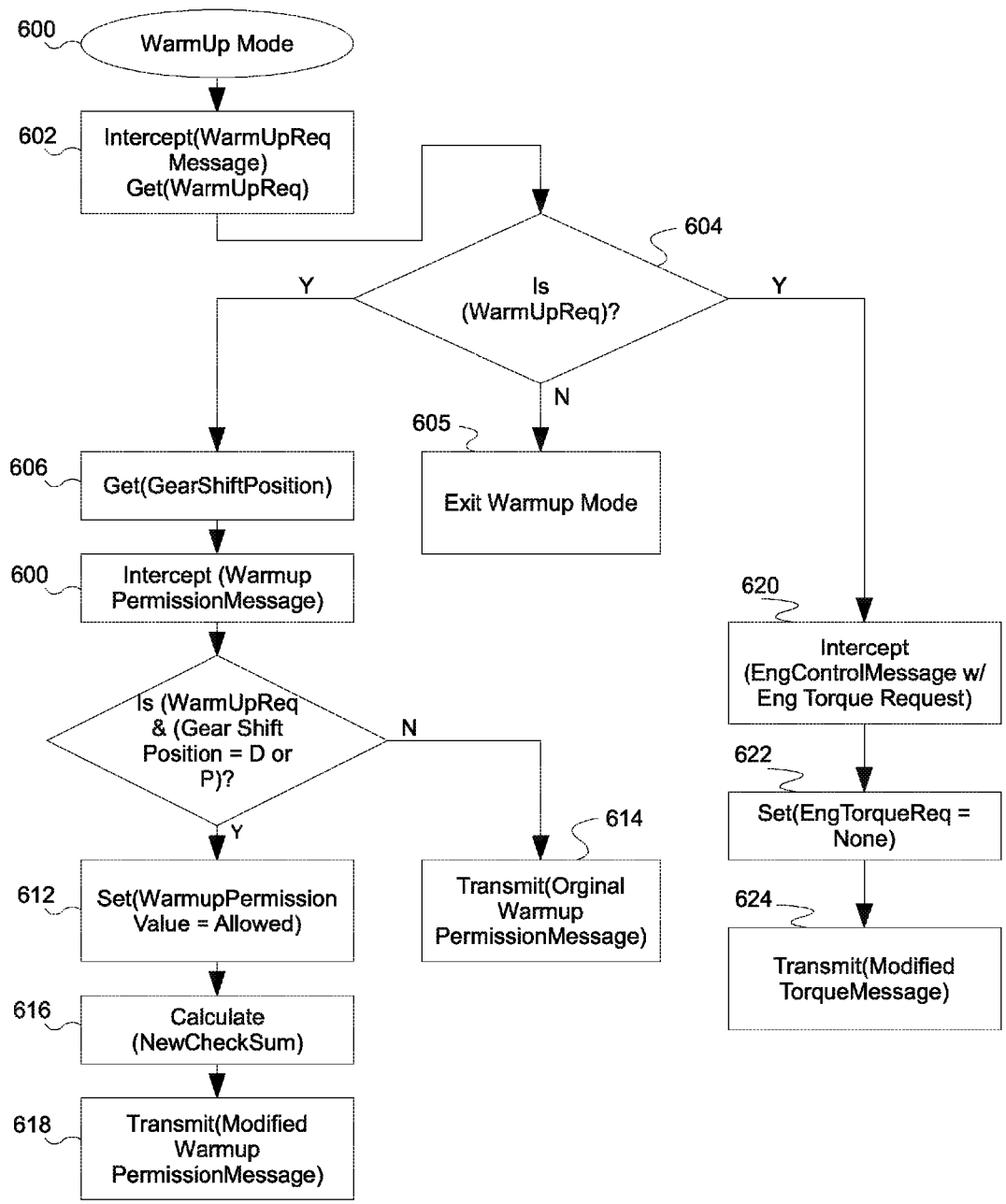
FIG. 6 is a flow diagram of an operation of the engine control device in a warmup mode.

Referring to FIG. 6, in step 602, the device intercepts a message from the E-ECU 23 to the H-ECU 24 having capable on containing an engine warmup request and may hold the value of that request in a variable or in the device's internal memory. In step 604, the device determines whether the message contains an engine warmup request. If the message does not contain an engine warmup request, in step 605 the device transmits the original message to the H-ECU 24. If the message contains an engine warmup request the device continues to branches started by step 606 or step 620. The device may operate these branches in parallel or in series. The device will hold intercepted messages in a memory of the device until the device considers the message in either of branch 606 or branch 620.

In step 606, the device intercepts a message from the H-ECU 24 having a gear shift position value representing the selected gear of the vehicle. The device in step 608 intercepts a message of the type capable of having an engine warmup permission instruction. In step 610, the device determines whether the E-ECU 23 is requesting permission to allow engine warmup in the message capable of containing an engine warmup request. Also in step 610, the device determines whether the vehicle is in the "drive" gear or "park" by reading the gear shift position value. If the E-ECU 23 is requesting permission for engine warmup and the vehicle is in drive or park, then in step 612, the device sets the engine warmup permission instruction of the message from the H-ECU 24 to a value allowing or granting permission for engine warmup mode. If the E-ECU 23 is not requesting permission for engine warmup or the vehicle is not in drive, then in step 614, the device transmits the original message capable of contain a warmup permission instruction to the E-ECU 23.

In step 606, the device calculates and inserts a new checksum value into the message from the H-ECU 24 corresponding to the modified message. In step 618, the device transmits the modified message having a value allowing or granting permission for engine warmup mode to the E-ECU.

In step 620, the device intercepts an engine control message capable of having an engine torque request. In step 622, the device sets the value of the message capable of containing an engine torque request to a value representing no torque requested. The device calculates and inserts a new checksum value into the modified message based on the modified message. In step 624, the device transmits the modified message to the E-ECU 23. Eliminating any requested torque in a message that is of the type capable of having an engine warmup permission instruction lowers the emissions during engine warmup.

In one embodiment, the device modifies particular bytes and/or bits of particular of messages having a particular message identification numbers to carry out the above described function of the device in the warmup mode. One skilled in the art will recognize that the invention is not limited to the following description of particularly modified bytes and/or bits of particular messages having particular message identification numbers. In engine warmup mode, a message from the E-ECU 23 to the H-ECU 24 having capable of containing an engine warmup request has a message ID of 0x3C8 where the warmup request is represented in bit #1 of byte #0. A value of 1 in bit #1 represents a request by the E-ECU 23 for permission to operate the engine in warmup mode. A message capable of having a gear shift position value representing the presently selected gear of the vehicle, has a message ID of 0x540 where the gear shift position value is represented in byte #1. A value of 0x10 in byte #1 indicates the vehicle is in drive and a value of 0x80 indicates the vehicle is in Park. A message of the type capable of having an engine warmup permission instruction has a message ID of 0x3CA where byte #0 contains value representing a whether warmup is allowed. Setting bit #1 to 1 or an on value in byte #0 allows the engine to operate in warmup mode.

Engine Control Messages and Engine Request Messages

An engine start command may be any bit, byte, signal, or message that, in whole or in part, when received by the E-ECU 23 causes the E-ECU 23 to signal the engine to consume fuel. An off-engine indicating command is any bit, byte, signal, or message that, in whole or in part, when received by the E-ECU 23 causes the E-ECU 23 to signal the engine not to consume fuel.

In each case where the device modifies a message and the message contains a checksum value, the device also modifies the checksum value contained in the message. Generally, a checksum value is a fixed-size datum computed from a block of digital data of the message for the purpose of detecting accidental errors that may have been introduced during its transmissions or storage. The device calculates and inserts the correct checksum value for the modified message.

In one embodiment, the checksum is calculated using a checksum calculating algorithm by first computing a sum value by adding the message ID, the message length, the byte containing the highest value of the bytes in the message, and the values of each byte. To complete the checksum calculation, the device performs the modulo operation to find the remainder of division of the sum value by 256. The integrity of the data can be checked at any later time by re-computing the checksum and comparing it with the one stored in the message.

While particular sequences are shown and described herein, one skilled in the art will recognize that where a step requires that a message be received or intercepted, the device 100 may intercept that message at an earlier point in time and hold the message in a memory of the device until that message is needed by the device or a function of the device 100. One skilled in the art will recognize that while the device may be shown as used with one type or model of hybrid vehicle, the device is not limited to use with only one type or model of hybrid vehicle.

In the illustrated embodiment, the engine control device 100, the E-ECU 23, and/or the H-ECU 24 can be implemented as a programmed general purpose computer, or a single special purpose integrated circuit (e.g., ASIC) having a main or central processor section for overall, system-level control, and separate sections dedicated to performing various different specific computations, functions and other processes under control of the central processor section. The engine control device 100, the E-ECU 23, and/or the H-ECU can be a plurality of separate dedicated or programmable integrated or other electronic circuits or devices (e.g., hard-wired electronic or logic circuits such as discrete element circuits, or programmable logic devices such as PLDs, PLAs, PALs or the like). The engine control device 100, the E-ECU 23, and/or the H-ECU can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the engine control device 100, the E-ECU 23, and/or the H-ECU 24.

From the foregoing, it will be observed that numerous variations and modifications may be effected without departing from the spirit and scope of the invention. In actual production designs, provisions for user friendliness, for economic manufacturing practices and techniques, and for maximizing effectiveness would be included and provided for which have not been identified as part of this patent but which would still render the device as being completely covered under the intent of this patent. The embodiment previously described is illustrative of the principles of this invention. It should be understood, modifications can be made without departing from the scope of the invention. It is to be understood that no limitation with respect to the specific apparatus illustrated herein is intended or should be inferred. It is intended to cover by the appended claims all such modifications as fall within the scope of the claims.

The invention claimed is:

1. An engine control device for a vehicle incorporating an internal combustion engine and a motor that are capable of transmitting motive output to an axle, comprising:
   an input configured to intercept a computer readable engine control message or an engine request message;
   a computer readable engine utilization reduction portion configured to reduce the output supplied by the engine when an engine control message requests an engine output above an engine output minimum value when the device is in a hybrid mode;
   an output configured to transmit a computer readable message;
   the computer readable engine utilization reduction portion is signal connected to the input and the output.

2. The engine control device of claim 1, comprising:
   a computer readable engine off portion configured to prevent the engine from starting or consuming fuel; the engine off portion signal connected to the input and the output.

3. The engine control device of claim 2, wherein the input is configured to intercept an engine control message having an engine output request value; and
   wherein the engine off portion comprises an engine output request modification portion configured prevent the engine from starting or consuming fuel when the engine output request represents an engine output request greater than zero.

4. The engine control device of claim 3, wherein the engine output request modification portion is configured to change the engine output request value to a new engine output request value corresponding to an engine output request of zero when the engine output request value corresponds to an engine output request greater than zero.

5. The engine control device of claim 4, wherein the input is configured to intercept an engine control message having an engine control flag and a fuel cut flag, and
   wherein the engine off portion comprises an engine control flag modification portion configured to change the engine control flag to signal an engine off condition, and
   the engine off portion comprises a fuel cut flag modification portion configured stop the follow of fuel to the engine.

6. The engine control device of claim 2, wherein the input is configured to intercept an engine control message having an engine speed request value; and
   wherein the engine off portion comprises engine speed modification portion configured to change the speed value to a new engine speed request value corresponding to an engine speed request of zero when the engine output request value corresponds to an engine speed request greater than zero.

7. The engine control device of claim 1, wherein the input is connected to a vehicle main controller and the output is connected to a second engine controller and wherein the engine control device intercepts at least one type of engine control message or engine request message traveling between the vehicle main controller and the second engine controller.

8. The engine control device of claim 1, wherein the input is configured to intercept an engine control message having an engine torque request;
   and wherein the engine utilization reduction portion comprises an engine output request modification portion configured prevent the engine from starting or consuming fuel when the engine torque request value represents an engine output request less than an available motor torque.

9. The engine control device of claim 1, wherein the input is configured to intercept an engine control message having an engine torque request;
   and wherein the engine utilization reduction portion comprises an engine torque request modification portion configured to reduce the engine output to a reduced engine output, where the engine utilization reduction portion is configured to calculate the reduced engine output by subtracting the engine torque request from an available motor torque representing torque available from the motor.

10. The engine control device of claim 1, wherein the engine utilization reduction portion is configured to limit the output supplied by the engine when the engine temperature is below a predefined engine operating temperature.

11. The engine control device of claim 1, comprising a warmup mode and a warmup portion,
    the warm up portion is configured to operate the engine in warmup mode and limit the output supplied by the engine when the engine temperature is below a predefined engine operating temperature.

12. The engine control device of claim 1, comprising a warmup mode and a warm up portion, the warm up portion is configured to operate the engine in warmup mode and limit the output supplied by the engine when a second engine controller signal connected to the engine control device requests to operate the engine in warmup mode and when a main vehicle controller signal connected to the engine control device indicates the vehicle is in a drive mode.

13. The engine control device of claim 1, wherein the input is configured to intercept an engine control message having an engine torque request;
    and wherein the engine utilization reduction portion comprises an engine output request modification portion configured to set the engine output minimum value to a zero engine output value to prevent the engine from starting or consuming fuel when the engine torque request value represents an engine output request less than an available motor torque.

14. The engine control device of claim 1, wherein the input is configured to intercept an engine control message having an engine torque request;
    and wherein the engine utilization reduction portion comprises an engine torque request modification portion configured to set the engine output minimum value to a reduced engine output value to reduce the engine output to a reduced engine output, where the engine utilization reduction portion is configured to calculate the reduced engine output by subtracting the engine torque request from an available motor torque representing torque available from the motor.

15. An engine control device for a vehicle incorporating an internal combustion engine and a motor that are capable of transmitting motive output to an axle, comprising:
    an input configured to intercept a computer readable message;
    an engine utilization reduction function configured to reduce the output supplied by the engine when a requested engine output is above a predefined engine output minimum value when the device is in a hybrid mode;
    an output configured to transmit a computer readable message; and
    the engine utilization reduction function is signal connected to the input and the output.

16. The engine control device of claim 15, comprising:
    a mode control function configured to selectively switch the device between an electric only mode where the device prevents the engine from consuming fuel and the hybrid mode where the device permits the engine and the motor output the vehicle; and
    an engine off function for preventing the engine from starting or consuming fuel when the device is in the electric only mode; the engine off function signal connected the input and the output.

17. The engine control device of claim 16, wherein the input is configured to intercept an engine control message capable of having an engine output request value; and
    wherein the engine off function comprises an engine output request modification function configured prevent the engine from starting or consuming fuel when the engine output request represents an engine output request greater than zero.

18. The engine control device of claim 15, wherein the input is configured to connect to a vehicle main controller and the output is configured to connect to a second engine controller and wherein the engine control device intercepts at least one type of engine control message or an engine request message traveling between the vehicle main controller and second engine controller.

19. The engine control device of claim 15, wherein the input is configured to intercept an engine control message having an engine torque request;
    and wherein the engine utilization reduction function comprises an engine output request modification function configured prevent the engine from starting or consuming fuel when the engine torque request value represents an engine output request less than an available motor torque.

20. The engine control device of claim 15, wherein the input is configured to intercept an engine control message having an engine torque request;

and wherein the engine utilization reduction function comprises an engine torque request modification function to reduce the output supplied by the engine to a reduced torque output, where the engine utilization reduction function is configured to calculate the reduced torque output by subtracting the engine torque request from an available motor torque.

21. The engine control device of claim 15, comprising a warmup mode and a warmup function, wherein the mode control function is configured to selectively switch between the electric only mode, the enhanced hybrid mode, and the warmup mode;

the warm up function is configured to operate the engine in warmup mode and limit the output supplied by the engine when a second engine controller signal connected to the engine control device requests to operate the engine in warmup mode and when a main vehicle controller signal connected to the engine control device indicates the vehicle is in a drive mode.

22. A method of controlling an engine of a hybrid vehicle, the vehicle having an internal combustion engine and a motor that are capable of transmitting motive power to an axle, comprising the steps of:

reducing the engine output supplied by the engine when a requested engine output is above a engine output minimum value if there is an available motor output.

23. The method of claim 22, wherein the step of reducing the engine output comprises the steps of:

intercepting an engine control message from a main vehicle controller having a requested engine torque;

calculating a new engine torque by subtracting the requested engine torque from an available motor torque, wherein the available motor output comprises the available motor torque; and powering the engine at the new engine torque if the new engine torque is greater than zero torque.

* * * * *